(12) United States Patent
Cigarini et al.

(10) Patent No.: US 9,907,225 B2
(45) Date of Patent: Mar. 6, 2018

(54) HEDGE TRIMMER HEAD HAVING A TAPPING BODY

(71) Applicant: TECOMEC S.R.L., Reggio Emilia (IT)

(72) Inventors: Enrico Cigarini, Reggio Emilia (IT); Salvatore Longo, Cadelbosco Sopra (IT)

(73) Assignee: TECOMEC S.R.L., Reggio Emilia (IT)

(*) Notice: Subject to any disclaimer, the term of this patent is extended or adjusted under 35 U.S.C. 154(b) by 14 days.

(21) Appl. No.: 14/881,949

(22) Filed: Oct. 13, 2015

(65) Prior Publication Data

US 2016/0106032 A1 Apr. 21, 2016

(30) Foreign Application Priority Data

Oct. 21, 2014 (IT) .............................. MO2014A0298

(51) Int. Cl.
*A01D 34/416* (2006.01)

(52) U.S. Cl.
CPC ....... *A01D 34/416* (2013.01); *A01D 34/4163* (2013.01)

(58) Field of Classification Search
CPC .............. A01D 34/416; A01D 34/4163; A01D 34/4165; A01D 34/4166; A01D 34/4168
USPC .............................................. 30/276; D8/7–9
See application file for complete search history.

(56) References Cited

U.S. PATENT DOCUMENTS

| 3,670,413 | A | * | 6/1972 | Weber ................ | A01D 34/6806 30/276 |
| 4,007,526 | A | * | 2/1977 | Langenstein ........ | A01D 34/416 30/276 |
| 4,148,141 | A | * | 4/1979 | Hoff ..................... | A01D 34/416 30/276 |
| 4,161,820 | A | * | 7/1979 | Moore ............... | A01D 34/4163 30/276 |
| 4,183,138 | A | * | 1/1980 | Mitchell ........... | A01D 34/4163 30/276 |
| 4,189,830 | A | * | 2/1980 | Pittinger, Jr. ........ | A01D 34/416 30/276 |
| 4,203,212 | A | * | 5/1980 | Proulx ............... | A01D 34/4163 30/276 |
| 4,211,004 | A | * | 7/1980 | Woods ............... | A01D 34/4161 30/276 |
| 4,249,310 | A | * | 2/1981 | Secoura ................. | A01D 34/73 30/276 |
| 4,254,550 | A | * | 3/1981 | Satoh ................ | A01D 34/4161 30/276 |
| 4,259,782 | A | * | 4/1981 | Proulx ............... | A01D 34/4163 30/276 |

(Continued)

FOREIGN PATENT DOCUMENTS

| CA | 2931035 | A1 | * | 5/2015 | ......... A01D 34/4163 |
| DE | 2856711 | A1 | * | 7/1980 | ........... A01D 34/416 |

(Continued)

*Primary Examiner* — Jason Daniel Prone
(74) *Attorney, Agent, or Firm* — Pearne & Gordon LLP

(57) ABSTRACT

A tapping body for a head for a hedge trimmer that includes a lower portion (2), destined to be tapped or pressed onto the ground, and a side portion (3) which is so structured as to be arranged through a lower opening (11) of a casing (10) of the head; a projecting part (4), which protrudes externally to the side portion (3) and is provided with a lower waved profile (41).

6 Claims, 5 Drawing Sheets

(56) References Cited

U.S. PATENT DOCUMENTS

| | | | | |
|---|---|---|---|---|
| 4,524,515 A * | 6/1985 | Oberg | A01D 34/4163 | 30/276 |
| 4,660,286 A * | 4/1987 | Engelbrecht | A01D 34/4162 | 30/276 |
| 4,672,798 A | 6/1987 | Ota | | |
| 4,685,279 A * | 8/1987 | Gullett | A01D 34/416 | 30/276 |
| 4,702,005 A * | 10/1987 | Pittinger, Sr. | A01D 34/4163 | 30/276 |
| 4,707,919 A * | 11/1987 | Tsuchiya | A01G 3/06 | 30/276 |
| 4,738,085 A * | 4/1988 | Nishio | A01D 34/4163 | 30/276 |
| 4,817,289 A * | 4/1989 | Baba | A01D 34/4163 | 30/276 |
| 4,823,465 A * | 4/1989 | Collins | A01D 34/4163 | 30/276 |
| 4,827,702 A * | 5/1989 | Cerreta | A01D 34/416 | 30/276 |
| 4,835,950 A * | 6/1989 | Cerreta | A01D 34/416 | 56/12.8 |
| 4,959,904 A * | 10/1990 | Proulx | A01D 34/4163 | 30/276 |
| 5,020,224 A * | 6/1991 | Haupt | A01D 34/4162 | 30/276 |
| 5,174,027 A * | 12/1992 | Gusthalin | A01D 34/416 | 30/276 |
| D346,727 S * | 5/1994 | Eriksson | D8/8 | |
| 5,339,526 A * | 8/1994 | Everts | A01D 34/4165 | 30/276 |
| 5,657,542 A | 8/1997 | White et al. | | |
| 5,749,148 A | 5/1998 | White, III et al. | | |
| 5,765,287 A * | 6/1998 | Griffini | A01D 34/4163 | 30/276 |
| 5,836,227 A * | 11/1998 | Dees, Jr. | A01D 34/416 | 30/276 |
| 5,881,464 A * | 3/1999 | Collins | A01D 34/4163 | 30/276 |
| 5,881,465 A * | 3/1999 | Brant | A01D 34/4163 | 30/276 |
| 6,032,369 A * | 3/2000 | Tada | A01D 34/90 | 30/276 |
| 6,035,618 A * | 3/2000 | Fogle | A01D 34/4166 | 30/276 |
| 6,148,523 A * | 11/2000 | Everts | A01D 34/4163 | 30/276 |
| 6,279,235 B1 | 8/2001 | White, III et al. | | |
| 6,446,346 B1 * | 9/2002 | Castleman | A01D 34/416 | 30/276 |
| 6,457,242 B1 * | 10/2002 | Fogle | A01D 34/4166 | 30/276 |
| 6,481,107 B2 * | 11/2002 | Berfield | A01D 34/4168 | 30/276 |
| 6,594,907 B2 * | 7/2003 | Wilson | A01D 34/4162 | 30/276 |
| 6,666,009 B1 * | 12/2003 | Brandon | A01D 34/4166 | 30/276 |
| 6,705,016 B2 * | 3/2004 | Nystrom | A01D 34/74 | 30/276 |
| 6,722,040 B2 * | 4/2004 | Sullivan | A01D 34/416 | 30/276 |
| 6,735,874 B2 * | 5/2004 | Iacona | A01D 34/4163 | 30/276 |
| 6,851,191 B2 * | 2/2005 | Arnetoli | A01D 34/4163 | 30/276 |
| 6,901,667 B2 * | 6/2005 | Proulx | A01D 34/4163 | 30/276 |
| 6,912,789 B2 * | 7/2005 | Price, III | A01D 34/733 | 30/276 |
| 6,983,543 B2 * | 1/2006 | Fogle | A01D 34/4166 | 30/276 |
| 7,000,324 B2 * | 2/2006 | Fogle | A01D 34/416 | 30/276 |
| 7,219,431 B2 * | 5/2007 | Robison | A01D 34/416 | 30/276 |
| 7,395,601 B2 * | 7/2008 | Berfield | A01D 34/416 | 30/276 |
| 7,412,768 B2 * | 8/2008 | Alliss | A01D 34/4163 | 30/276 |
| 7,614,153 B2 * | 11/2009 | Guerra | A01D 34/733 | 30/276 |
| 7,624,559 B2 * | 12/2009 | Hishida | A01D 34/902 | 30/276 |
| 7,640,668 B2 * | 1/2010 | Iacona | A01D 34/4163 | 30/276 |
| 7,665,215 B2 * | 2/2010 | Fogle | A01D 34/416 | 30/276 |
| 7,797,839 B2 * | 9/2010 | Proulx | A01D 34/416 | 30/276 |
| D630,068 S * | 1/2011 | Proulx | D8/8 | |
| 7,966,736 B2 * | 6/2011 | Arnetoli | A01D 34/4166 | 30/276 |
| 7,984,555 B2 * | 7/2011 | Arnetoli | A01D 34/4163 | 30/276 |
| 8,001,694 B2 * | 8/2011 | Sing | A01D 34/4166 | 30/276 |
| 8,025,249 B2 * | 9/2011 | Alliss | A01D 34/4165 | 30/276 |
| D653,920 S * | 2/2012 | Cigarini | D8/8 | |
| 8,266,805 B1 * | 9/2012 | Alliss | A01D 34/4163 | 30/276 |
| 8,429,886 B2 * | 4/2013 | Kato | A01D 34/4163 | 30/276 |
| 8,510,960 B2 * | 8/2013 | Pfaltzgraff | A01D 34/4165 | 30/276 |
| 8,567,073 B2 * | 10/2013 | Proulx | A01D 34/416 | 30/276 |
| 8,567,074 B2 * | 10/2013 | Arnetoli | A01D 34/4163 | 30/276 |
| 8,689,451 B2 * | 4/2014 | Cigarini | A01D 34/416 | 30/276 |
| 8,707,567 B2 * | 4/2014 | Proulx | A01D 34/4165 | 30/276 |
| 8,745,880 B2 * | 6/2014 | Kato | A01D 34/4163 | 30/276 |
| D715,608 S * | 10/2014 | Cigarini | D8/8 | |
| D717,136 S * | 11/2014 | Baxter | D8/8 | |
| 8,910,387 B2 * | 12/2014 | Alliss | A01D 34/4162 | 30/276 |
| 8,910,388 B2 * | 12/2014 | Proulx | A01D 34/416 | 30/276 |
| 9,078,394 B2 * | 7/2015 | Harless | A01D 34/416 | 30/276 |
| D763,640 S * | 8/2016 | Cigarini | D8/8 | |
| 9,635,808 B2 * | 5/2017 | Longo | A01D 34/416 | 30/276 |
| D789,166 S * | 6/2017 | Cigarini | D8/8 | |
| D789,167 S * | 6/2017 | Cigarini | D8/8 | |
| D789,168 S * | 6/2017 | Cigarini | D8/8 | |
| D796,293 S * | 9/2017 | Alliss | D8/8 | |
| 9,750,181 B2 * | 9/2017 | Cigarini | A01D 34/4166 | 30/276 |
| 2002/0170183 A1 | 11/2002 | Sugihara et al. | | |
| 2003/0037442 A1 * | 2/2003 | Lyon | A01D 34/416 | 30/276 |
| 2006/0254061 A1 * | 11/2006 | Alliss | A01D 34/4161 | 30/276 |
| 2009/0172955 A1 * | 7/2009 | Morris et al. | A01D 34/4163 | 30/276 |
| 2011/0119932 A1 | 5/2011 | Pfaltzgraff et al. | | |
| 2011/0258861 A1 * | 10/2011 | Andrews | A01D 34/416 | 30/276 |
| 2011/0302793 A1 * | 12/2011 | Alliss | A01D 34/4166 | 30/347 |
| 2012/0066913 A1 * | 3/2012 | Alliss | A01D 34/4165 | 30/276 |

(56) References Cited

U.S. PATENT DOCUMENTS

| | | | |
|---|---|---|---|
| 2015/0101199 A1* | 4/2015 | Cigarini | A01D 34/4166 30/276 |
| 2015/0121707 A1* | 5/2015 | Li | A01D 34/4166 30/276 |
| 2015/0150191 A1* | 6/2015 | Alliss | A01D 34/4163 30/276 |
| 2015/0223395 A1* | 8/2015 | Pellenc | A01D 34/4161 30/276 |
| 2015/0264861 A1* | 9/2015 | Kullberg | A01D 34/4165 30/276 |
| 2015/0342116 A1* | 12/2015 | Sprungman | A01D 34/4163 30/276 |
| 2016/0081268 A1* | 3/2016 | Lang | A01D 34/4166 30/276 |
| 2016/0106033 A1* | 4/2016 | Longo | A01D 34/416 30/276 |
| 2016/0106035 A1* | 4/2016 | Longo | A01D 34/416 30/276 |
| 2016/0235001 A1* | 8/2016 | Cigarini | A01D 34/416 30/276 |
| 2017/0042086 A1* | 2/2017 | Rethaber | A01D 34/4166 30/276 |

FOREIGN PATENT DOCUMENTS

| | | | |
|---|---|---|---|
| DE | 4321650 C1 * | 10/1994 | A01D 34/4166 |
| DE | 102015010579 A1 * | 2/2017 | A01D 34/4166 |
| EP | 1174017 A1 * | 1/2002 | A01D 34/416 |
| EP | 1894459 A1 * | 3/2008 | A01D 34/4163 |
| EP | 3011819 A1 * | 4/2016 | A01D 34/416 |
| EP | 3011820 A1 * | 4/2016 | A01D 34/416 |
| EP | 3011821 A1 * | 4/2016 | A01D 34/4163 |
| EP | 3130212 A1 * | 2/2017 | A01D 34/4166 |
| FR | 2843852 A1 * | 3/2004 | A01D 34/416 |

* cited by examiner

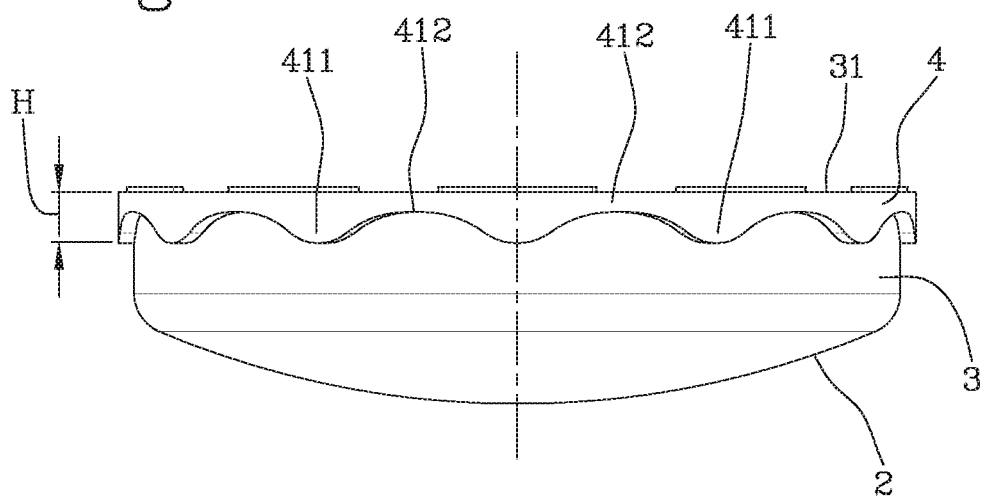
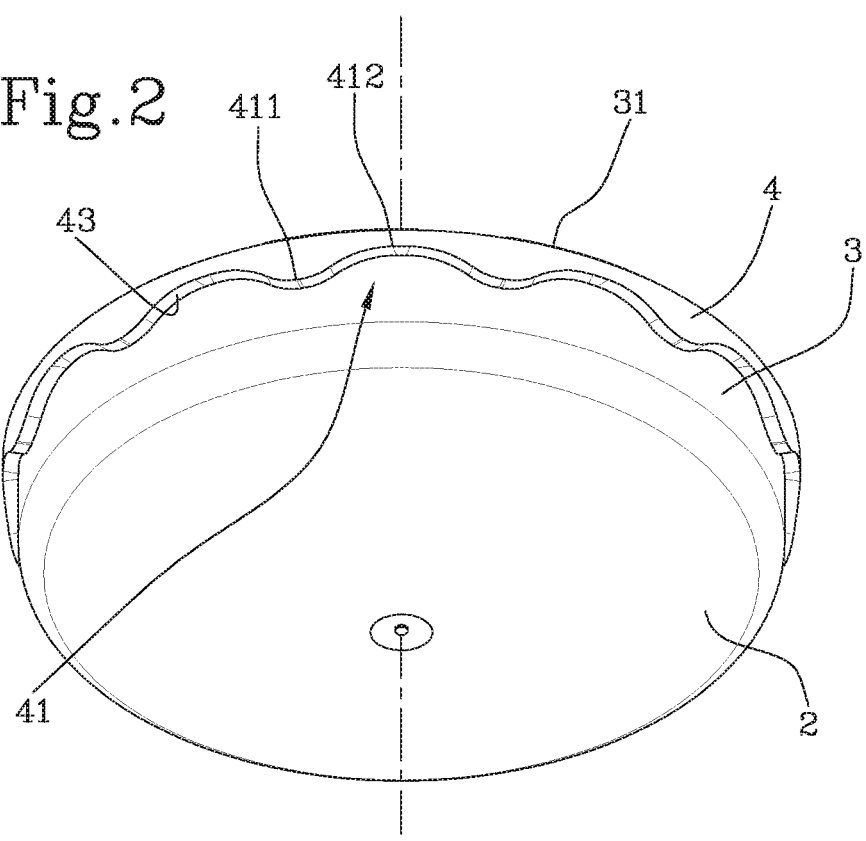

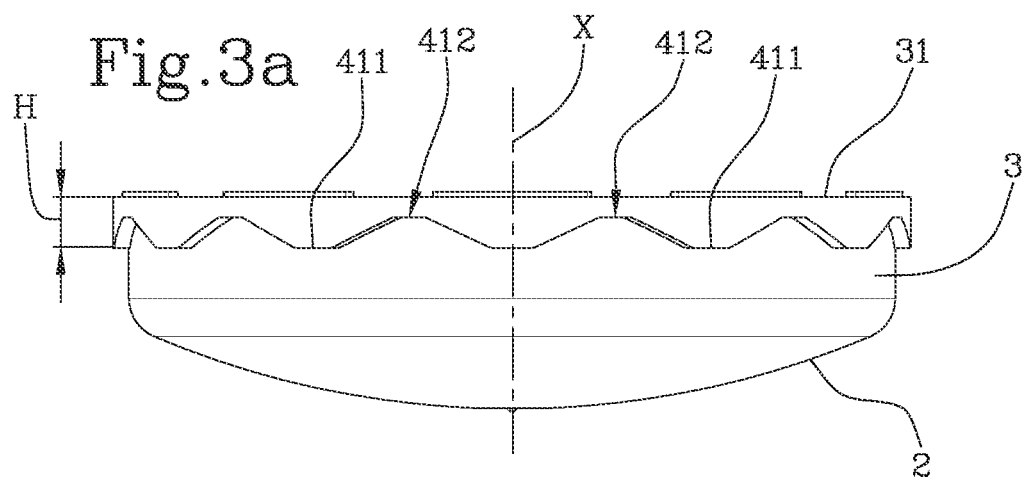
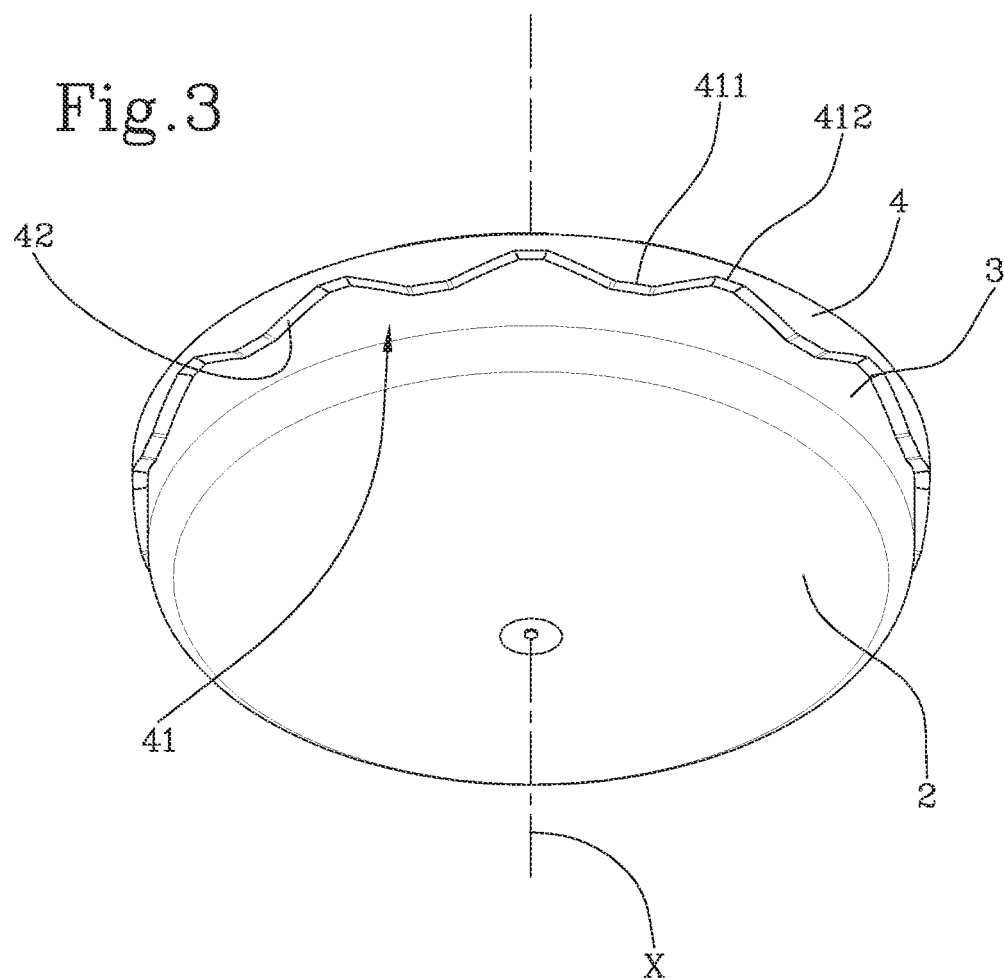

HEDGE TRIMMER HEAD HAVING A TAPPING BODY

FIELD OF THE INVENTION

The invention relates to a head for an hedge trimmer.

DESCRIPTION OF RELATED ART

The heads for hedge trimmers comprise a casing, wherein there are housed a cutting wire reel and a mechanism which allows winding and/or unwinding of the cutting wire reel. The casing is intended to be coupled to a drive shaft to be driven in rotation at a desired speed. The speed of rotation of the head is generally in the range of 10,000-12,000 rev./min.

At least two end portions of the cutting wire project out from the casing through corresponding side openings (A). During use, the wire portions projecting outwardly the casing, wear out progressively due to the fact that they come in contact with the plants to be cut. The worn portions can be replaced by partially unwinding the cutting wire reel via aforementioned mechanism which is comprised within the casing. In some hedge trimmer heads, once the reel is terminated, it is possible to replace it with a new one inside the casing or, in other types of heads, wrapping of the new reel can occur by means of aforementioned mechanism predisposed internally of the casing.

There are widely spread on the market cutting heads which comprise an unwinding mechanism commonly known as "tap and go". Such a mechanism, well known in the industry and therefore herein not described in detail, substantially comprises an anchoring device that can assume two configurations, a locking configuration, wherein rotation of the wire reel relative to the casing of the head is prevented, and a release configuration which allows a limited rotation of the wire reel with respect to the casing of the head. When the anchoring device is in the release configuration thereof, the wire is unwound for a length corresponding to the rotation performed by the reel relative to the casing of the head due to the effect of the centrifugal force.

The anchoring device is maintained in the locking configuration via elastic means, typically a spring which presses downwards while maintaining the reel or another element engaged in the locking means, such as a set of front teeth. In order for the anchoring device to be brought in the release position thereof, it is necessary to overcome the action exerted by the spring and to disengage the reel, or other element from the locking means.

To this end, the "tap and go" heads are inferiorly provided with a tapping body placed in contact of the reel, or other element which is engaged with the locking means. Such tapping body can move relative to the casing of the head along a direction parallel to the axis of rotation of said head. By pressing the tapping body onto the ground, it is then possible to lift the reel or other element with respect to the locking means, thus allowing rotation of the reel. Once the rotation is completed, the elastic means brings again the reel into engagement with the locking means.

The steps briefly described take place when the head is being used, i.e., by simply tapping the same onto the ground.

In order for the tapping body to move relative to the casing and cause the release of the anchoring device, the projecting body is arranged through a lower opening of the casing, wherein it protrudes inferiorly therefrom. A slot with a certain width has to be maintained between the edge of said lower opening and the outer surface of the tapping body, in order to ensure the necessary clearance, due to which jamming of the projecting body can be prevented. During rotation of the head occurring relative to said slot, a strong vacuum is produced which attracts dirt inside the casing. Within a short time, the dirt that penetrates inside the casing obstructs the mechanism "tap and go", thus making it necessary to stop and remove the head in order for it to be removed.

It is an object of the present invention to provide a head for hedge trimmers which allows to overcome the drawbacks of the heads of the known type. The purpose of the present invention is attained by a tapping body according to claim 1.

An advantage of the tapping body according to claim 1 is that it prevents dirt from penetrating inside the casing of the head.

SUMMARY OF THE INVENTION

Another advantage of the tapping body according to claim 1 is that it perfectly works in combination with the mechanisms "tap and go" currently provided, and can thus be adopted on the heads of the prior art.

BRIEF DESCRIPTION OF THE DRAWINGS

Further characteristics and advantages of the present invention will better emerge from the detailed description that follows of a preferred embodiment of the invention, illustrated by way of non-limiting example in the accompanying figures wherein:

FIGS. 2 and 2a show schematically a second embodiment of the tapping element according to the present invention, in an axonometric view and side view;

FIGS. 3 and 3a show schematically a third embodiment of the tapping element according to the present invention, in an axonometric view and side view;

DETAILED DESCRIPTION OF PREFERRED EMBODIMENTS OF THE INVENTION

Figure 5:
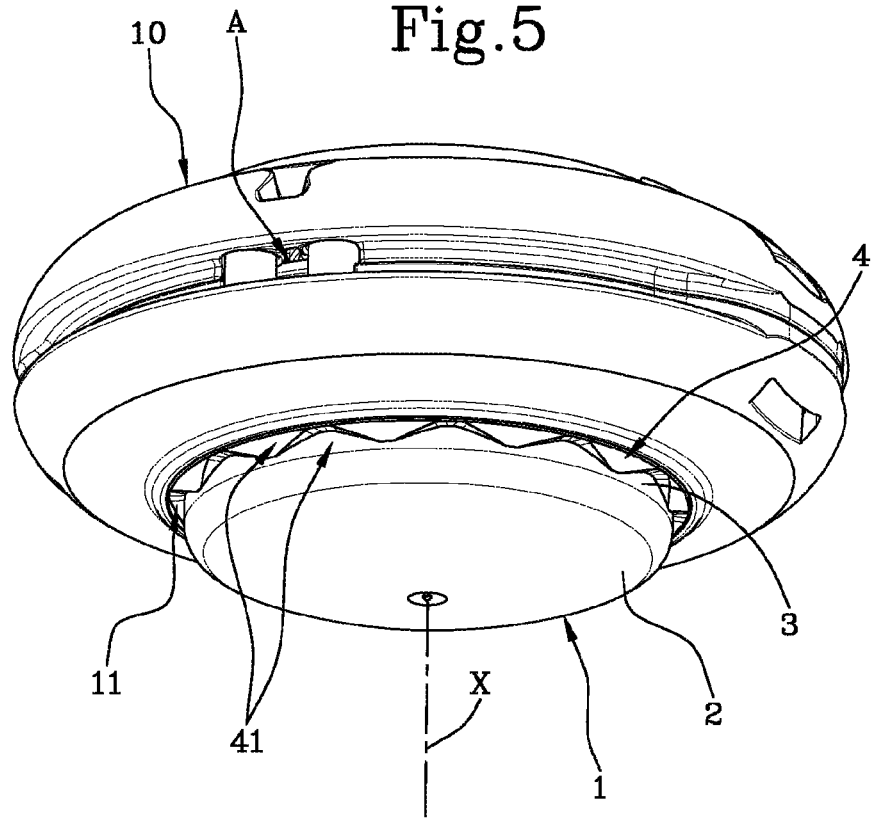
FIG. 5 shows a schematic view of a head that adopts the tapping element of FIG. 1.
Figure 6:
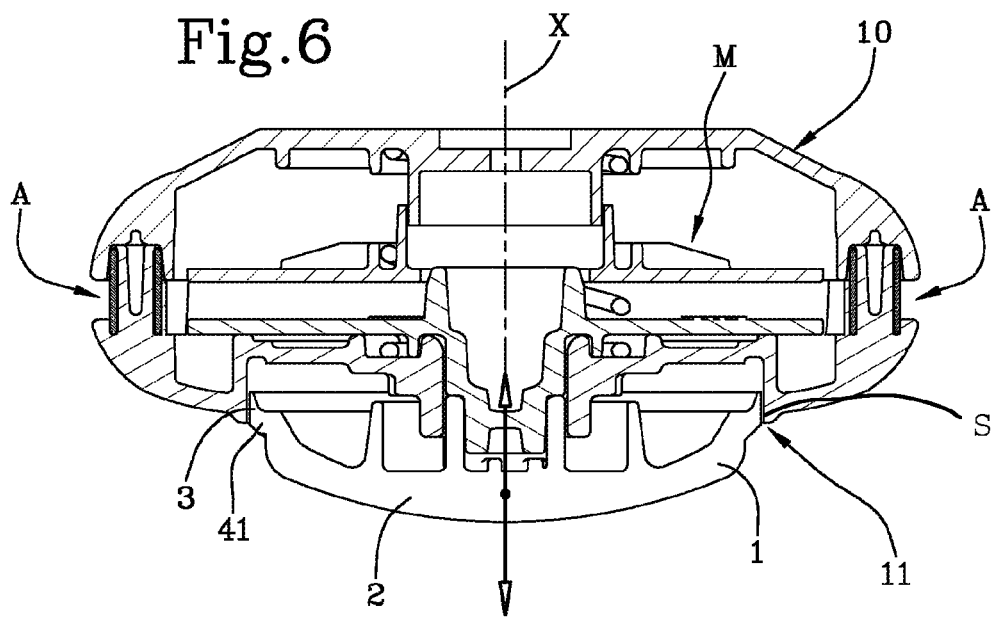
FIG. 6 shows the head of FIG. 5 in a sectional view taken by a plane containing the axis of rotation (X) of the head.

With reference to the figures listed above, the tapping body (1) according to the invention comprises a lower portion (2), intended to be tapped or pressed onto the ground, and a side portion (3), structured to be arranged through a lower opening (11) of a casing (10) for a head, as illustrated in figures 5 and 6. Preferably, the side portion (3) has a cylindrical shape, which is concentric to a longitudinal axis (X), which coincides with the axis of rotation (X) of the head when the tapping body is applied to said head. The lower portion (2) is connected inferiorly to the side portion (3), and preferably has a rounded or convex conformation.

The tapping body comprises a projecting part (4), which projects out externally of the side portion (3). The projecting part (4) preferably protruding radially from the side portion (3).

Preferably, the projecting part (4) extends circumferentially for the entire development of the side portion (3). In other words, the projecting part (4) completely surrounds the side portion (3), thereby occupying an annular band with a pre-determined height (H) along the longitudinal axis (X). In embodiments not illustrated, the projecting part (4) may be locally interrupted along the circumferential extension thereof, wherein the side portion (3) is partially left free. The projecting part (4) preferably extends from the end (31) of the side portion (3) to an intermediate zone located between said end (31) and the lower portion (2). The projecting part (4) exhibits a variable extension, that is, a variable height H, in the direction parallel to the side portion (3) and/or in the direction perpendicular to the side portion (3).

Figure 1A:
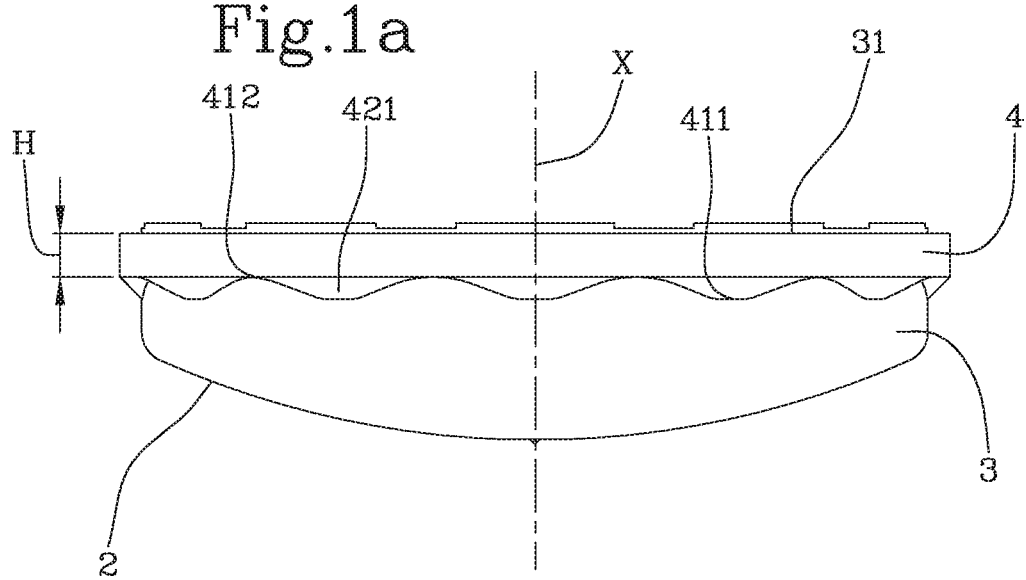
FIGS. 1 and 1a show schematically a first embodiment of the tapping element according to the present invention, in an axonometric view and side view.
Figure 1:
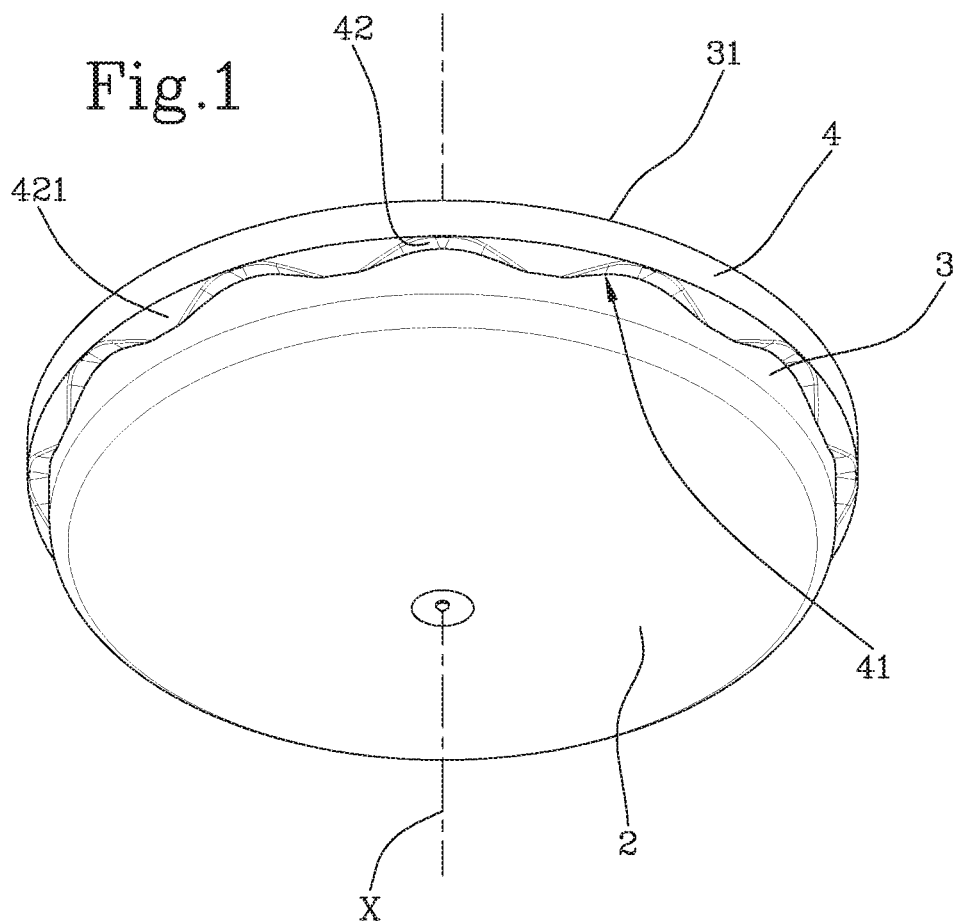

In the embodiments shown in FIGS. 1, 2 and 3, the projecting part (4) is provided with a lower waved profile (41).

In the embodiments shown in FIGS. 1 and 2, the waved profile (41) exhibits interconnected peaks and valleys with curvilinear development. In an alternative embodiment, shown in FIG. 3, the waved profile (41) has interconnected peaks (411) and valleys (412) with polygonal development. The curvilinear development produces less noise, while having a less accentuated aerodynamic effect than that generated by the polygonal development, which conversely produces more noise during rotation.

As shown in FIGS. 1,2 and 3, the waved profile (41) comprises an edge surface (42), facing downwards, which protrudes transversely from the side portion (3). In some connecting portions (421), the edge surface (42) can be so shaped as to progressively become reduced, until it is joined to the side portion (3) without protruding therefrom. As shown in FIG. 1, the connecting portions (421) are arranged relative to the peaks of the waved profile (41). This solution further reduces the noise produced by the tapping body (1) during rotation, as well as aerodynamic effect deriving therefrom, while preventing at the same time the dirt from penetrating inside the casing (10).

Figure 4A:
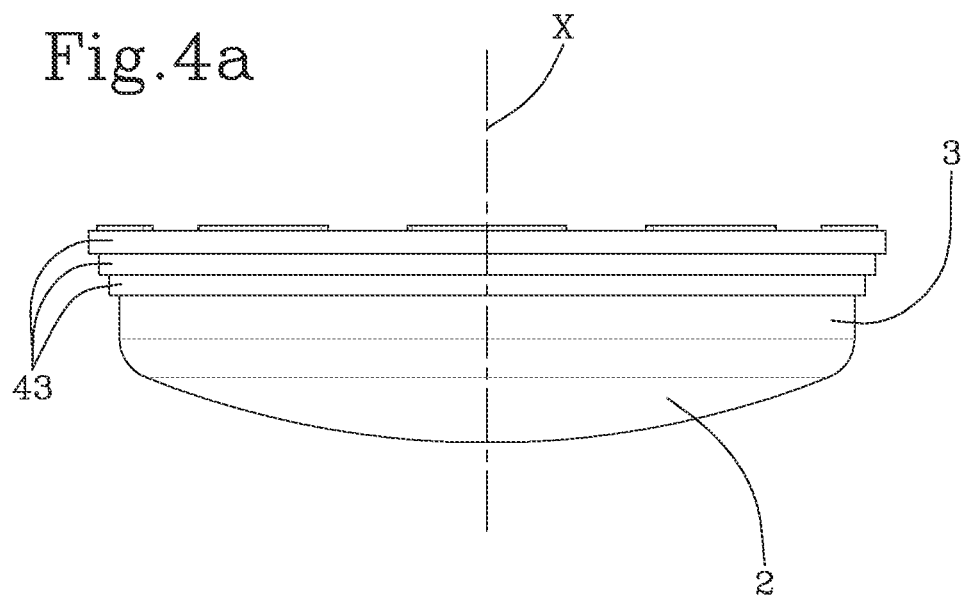
FIGS. 4 and 4a show schematically a fourth embodiment of the tapping element according to the present invention, in an axonometric view and side view.
Figure 4:
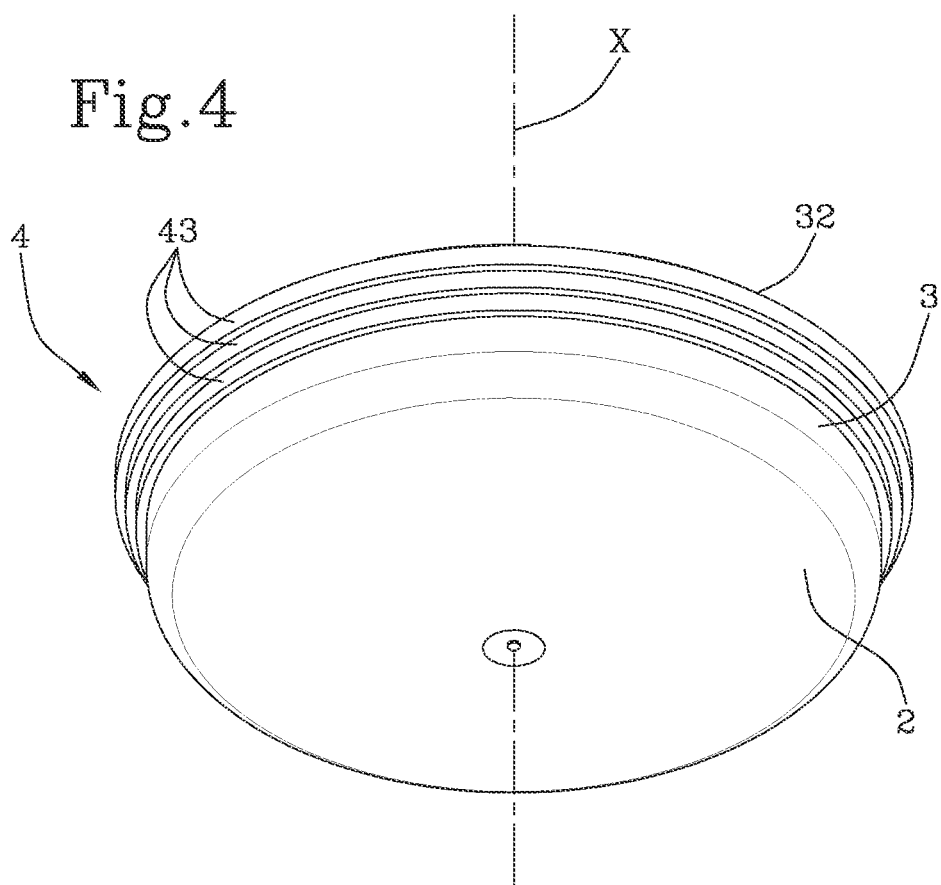

In a second embodiment, shown in FIG. 4, the projecting part (4) comprises one or more steps (43) protruding from the side portion (3) with different thicknesses.

Preferably, the steps (43) have different radial extensions with respect to the longitudinal axis (X). In particular, the radial extension of the steps (43) increases progressively away from the lower portion (2).

Owing to the presence of this projecting part (4) an extremely advantageous effect is obtained.

The projecting part (4), which is provided with an extension variable in the direction parallel to the side portion (3) and/or in the direction perpendicular to the side portion (3), is in fact able to remove the valley which is formed in the slot (S) between the side portion (3) and the edge of a lower opening (11) of the head casing (10), through which the tapping body (1) protrudes outwardly from said casing (10).

With particular reference to FIGS. 5 and 6, the casing (10) is predisposed for being set in rotation about an axis of rotation (X). The casing (10) contains an anchoring device (M) which can be operated between a locking configuration and a release configuration. Such anchoring device, known in the industry, will not be described in detail. The tapping body (1) is associated with the anchoring device and disposed through a lower opening (11) of the casing (10). As in the heads of the known type, a slot with a certain width shall be maintained between the side portion (3) of the tapping body (1) and the inner edge of the lower opening (11). The waved profile (41), or the steps (43), are relative to, or close to the lower opening (11), particularly to the inner edge of the lower opening (11). Preferably, the projecting edge (4) projects out at least partially below the lower opening (11). The Applicant has found that, the projecting part (4), provided with variable extension in the direction parallel to the side portion (3) and/or in the direction perpendicular to the side portion (3), prevents the dirt from getting inside the head. In other words, with same width of the slot, which slot is arranged between the lower opening (11) and the side portion (3) of the tapping body, the dirt does not penetrate inside the casing (10). The aerodynamic effect produced by the projecting part (4) in fact causes an increase of pressure due to which the dirt is rejected outwards.

The invention claimed is:

1. A head for a hedge trimmer comprising:
   a casing (10) arranged to be rotationally driven about an axis or rotation (X);
   a tapping body (1) comprising:
      a lower portion (2), and
      a side portion (3) that protrudes through a lower opening (11) of the casing (10);
      the side portion (3) having a projecting part (4) having a waved profile (41) which protrudes externally to the side portion (3) and extends a distance which is variable in a direction parallel to the side portion (3) and/or in a direction perpendicular to the side portion (3),
      a slot (S) being provided between the side portion (3) and an inner edge of the lower opening (11);
      wherein the tapping body (1) can move relative to the casing (10) along a direction parallel to the axis of rotation (X) as the casing (10) is rotating about the axis (X) and is disposed through the lower opening (11) of the casing (10), so that the waved profile (41) is at or in proximity of the lower opening (11).

2. A head for a hedge trimmer according to claim 1 in which the waved profile (41) has interconnected peaks and valleys with curvilinear development.

3. A head for a hedge trimmer according to claim 1, wherein the waved profile (41) has interconnected peaks and valleys with polygonal development.

4. A head for a hedge trimmer according to claim 1, wherein the waved profile (41) includes an edge surface (42) facing towards the lower portion (2) and projecting transversely from the side portion (3) defining the variable distance.

5. A head for a hedge trimmer according to claim 4, wherein the waved profile (41) includes connecting portions (421) and valleys (412) and the variable distance progressively becomes reduced as the edge surface (42) gets closer to the lower portion (2) via the connecting portions (421) and the valleys (412).

6. A head for a hedge trimmer according to claim 1, wherein the waved profile (41) protrudes at least partially below the lower opening (11).

* * * * *